US009457240B2

(12) United States Patent
Kennedy, III

(10) Patent No.: US 9,457,240 B2
(45) Date of Patent: Oct. 4, 2016

(54) GOLF BALL WITH CONFIGURABLE MATERIALS AND METHOD OF POST PRODUCTION MODIFICATION

(75) Inventor: Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 934 days.

(21) Appl. No.: 13/337,800

(22) Filed: Dec. 27, 2011

(65) Prior Publication Data

US 2013/0165259 A1 Jun. 27, 2013

(51) Int. Cl.

*A63B 37/06* (2006.01)
*A63B 47/00* (2006.01)
*B29C 71/04* (2006.01)

(Continued)

(52) U.S. Cl.

CPC ........... *A63B 47/00* (2013.01); *A63B 37/0003* (2013.01); *A63B 37/0024* (2013.01); *A63B 37/0026* (2013.01); *A63B 37/0031* (2013.01); *A63B 37/0039* (2013.01); *A63B 37/0043* (2013.01); *A63B 37/0051* (2013.01); *A63B 37/0062* (2013.01); *A63B 37/0077* (2013.01); *B29C 71/04* (2013.01); *A63B 37/0074* (2013.01); *A63B 37/0075* (2013.01); *A63B 37/0076* (2013.01); *A63B 45/00* (2013.01); *A63B 47/005* (2013.01); *B29C 2035/085* (2013.01); *B29C 2035/0855* (2013.01); *B29C 2035/0877* (2013.01)

(58) Field of Classification Search

CPC ....................... A63B 37/0039; A63B 37/0051
USPC .................................................. 473/373, 374
See application file for complete search history.

(56) References Cited

U.S. PATENT DOCUMENTS 3,989,568 A 11/1976 Isaac
5,413,332 A 5/1995 Montgomery (Continued)

FOREIGN PATENT DOCUMENTS

JP 02-140179 5/1990
JP 2001287472 10/2001

(Continued)

OTHER PUBLICATIONS

International Search Report and Written Opinion mailed Apr. 29, 2013 for PCT Application No. PCT/US2012/070515.

(Continued)

*Primary Examiner* — Raeann Gorden
(74) *Attorney, Agent, or Firm* — Honigman Miller Schwartz and Cohn LLP

(57) ABSTRACT

A golf ball including one or more configurable materials allows the attributes of the golf ball, including physical properties and play characteristics, to be changed by selective exposure of energy from an energy source to the golf ball. The exposure to the energy from the energy source causes certain configurable materials within the golf ball to undergo a physical change in structure, thereby changing the attributes of the modified golf ball. A method of post production modification of a golf ball allows the attributes of the golf ball to be changed to meet the desired attributes of a consumer. A customization system including multiple stock golf ball sets with different configurations is used with different energy sources to produce a variety of modified golf balls having different attributes. A distribution system processes stock golf balls using post production modification processes to produce different modified golf balls to consumers.

5 Claims, 12 Drawing Sheets

(51) Int. Cl.

| | |
|---|---|
| *A63B 37/00* | (2006.01) |
| *A63B 45/00* | (2006.01) |
| *B29C 35/08* | (2006.01) |

(56) References Cited

U.S. PATENT DOCUMENTS

| | | | |
|---|---|---|---|
| 5,542,677 | A | 8/1996 | Sullivan et al. |
| 5,795,247 | A | 8/1998 | Yokota et al. |
| 5,810,677 | A | 9/1998 | Maruko et al. |
| 5,857,925 | A | 1/1999 | Sullivan et al. |
| 5,891,973 | A | 4/1999 | Sullivan et al. |
| 6,018,003 | A | 1/2000 | Sullivan et al. |
| 6,130,411 | A | 10/2000 | Rockenfeller et al. |
| 6,174,388 | B1 | 1/2001 | Sikka et al. |
| 6,180,040 | B1 * | 1/2001 | Ladd et al. .................. 264/248 |
| 6,180,722 | B1 | 1/2001 | Dalton et al. |
| 6,207,095 | B1 | 3/2001 | Gosetti |
| 6,407,147 | B1 | 6/2002 | Kennedy, III et al. |
| 6,855,070 | B2 | 2/2005 | Hogge et al. |
| 6,936,205 | B2 | 8/2005 | Cavallaro et al. |
| 6,981,927 | B2 | 1/2006 | Aoyama |
| 7,048,651 | B2 | 5/2006 | Kennedy, III et al. |
| 7,148,266 | B2 | 12/2006 | Nesbitt et al. |
| 7,198,576 | B2 | 4/2007 | Sullivan et al. |
| 7,339,010 | B2 | 3/2008 | Kuntimaddi et al. |
| 7,377,863 | B2 | 5/2008 | Sullivan et al. |
| 7,427,243 | B2 | 9/2008 | Sullivan |
| 7,819,761 | B2 | 10/2010 | Kim et al. |
| 8,235,880 | B2 | 8/2012 | Guier |
| 8,602,914 | B2 | 12/2013 | Tutmark |
| 2003/0209840 | A1 | 11/2003 | Hogge et al. |
| 2004/0180735 | A1 * | 9/2004 | Sullivan ............. A63B 37/0003 473/371 |
| 2004/0234775 | A1 * | 11/2004 | Sullivan ............. A63B 37/0003 428/423.1 |
| 2004/0238388 | A1 | 12/2004 | Snell |
| 2006/0148590 | A1 | 7/2006 | Sullivan et al. |
| 2007/0227943 | A1 | 10/2007 | Foushee |
| 2008/0081710 | A1 | 4/2008 | Chen et al. |
| 2008/0273911 | A1 | 11/2008 | Gueret |
| 2010/0056299 | A1 | 3/2010 | Egashira |
| 2011/0009215 | A1 | 1/2011 | Ichikawa et al. |
| 2011/0053707 | A1 | 3/2011 | Ishii et al. |
| 2011/0064883 | A1 | 3/2011 | Goodwin |
| 2011/0095012 | A1 | 4/2011 | Cheng |
| 2011/0177890 | A1 | 7/2011 | Tutmark |
| 2012/0077621 | A1 | 3/2012 | Ishii et al. |
| 2012/0214615 | A1 | 8/2012 | Ishii et al. |
| 2013/0172121 | A1 | 7/2013 | Bender |
| 2013/0241111 | A1 | 9/2013 | Bender et al. |
| 2013/0256321 | A1 | 10/2013 | Bender |
| 2014/0066541 | A1 | 3/2014 | Tutmark |

FOREIGN PATENT DOCUMENTS

| | | | |
|---|---|---|---|
| JP | 2011189123 | A | 9/2011 |
| WO | 2008042416 | A1 | 4/2008 |

OTHER PUBLICATIONS

PCT International Search Report and Written Opion Application No. PCT/US2012/070931 dated Mar. 31 2013.

* cited by examiner

1000

| | WAVELENGTH (1002) | COR (1004) | SPIN (1006) | HARDNESS (1008) |
|---|---|---|---|---|
| 1010 | $10^{-x}$ | ✓✓ | ✓ | Ø |
| 1020 | $10^{-y}$ | ✓ | ✓✓ | ✓ |
| 1030 | $10^{-z}$ | Ø | ✓ | ✓✓ |

| | EXPOSURE TIME (1102) | COR (SOURCE 1) (1104) | SPIN (SOURCE 2) (1106) | HARDNESS (SOURCE 3) (1108) |
|---|---|---|---|---|
| 1110 | T1 | x | y | A |
| 1120 | T2 | 2x | y + 1 | B |
| 1130 | T3 | 3x | y + 2 | C |

FIG. 11

GOLF BALL WITH CONFIGURABLE MATERIALS AND METHOD OF POST PRODUCTION MODIFICATION

BACKGROUND

The present invention relates to a golf ball containing configurable materials, and in particular to a post production modification system and method for changing the attributes of a golf ball containing configurable materials.

Golf balls have undergone significant changes over the years. For example, rubber cores have gradually replaced wound cores because of consistent quality and performance benefits such as reducing of driver spin for longer distance. Other significant changes have also occurred in the cover and dimple patterns on the golf ball.

The design and technology of golf balls has advanced to the point that the United States Golf Association ("USGA") has instituted a rule prohibiting the use of any golf ball in a USGA-sanctioned event that can achieve an initial velocity of 250 ft/s, when struck by a driver having a velocity of 130 ft/s (referred to hereafter as "the USGA test".) (The Royal and Ancient Club St. Andrews ("R&A") has instituted a similar rule for R&A-sanctioned events.) Manufacturers place a great deal of emphasis on producing golf balls that consistently achieve the highest possible velocity in the USGA test without exceeding the limit. Even so, golf balls are available with a range of different attributes, including physical properties and play characteristics, such as spin when struck with a golf club, compression, cover hardness, coefficient of restitution (COR), and initial velocity. Thus, a variety of different balls may be available to meet the needs and desires of a wide range of golfers.

A golfer may use different golf balls having attributes associated with different play characteristics depending on the golfer's preferences. For example, different dimple patterns may affect the aerodynamic properties of the golf ball during flight, or a difference in the hardness may affect the rate of backspin. With regard to hardness in particular, a golfer may choose to use a golf ball having a cover layer and/or a core that is harder or softer. A golf ball having a hard cover layer will generally achieve greater distances but less spin, and so will be better for drives but more difficult to control on shorter shots. On the other hand, a golf ball having a softer cover layer will generally experience more spin and therefore be easier to control, but will lack distance. Similarly, changes to properties of other layers in the golf ball can affect play characteristics.

Presently, golf balls are produced in succinct, discrete stages where a combination of processes and materials are used to attain the desired attributes of the golf ball that is being produced. These attributes, including physical properties and play characteristics such as spin when struck with a golf club, compression, cover hardness, coefficient of restitution (COR), and initial velocity, are attained through construction and materials used in the manufacture of the golf ball. Once the golf ball is manufactured, the attributes of the golf ball are set and there is typically no later change in the physical properties of the material using in the manufacture of the golf ball, aside from property degradation caused by weathering, moisture absorption, polymer degradation, and other environmental and aging factors.

Accordingly, a number of different golf ball materials are mixed and matched in various combinations and arrangements to create golf balls having different attributes to provide golfers with a variety of choices to meet their needs. However, designing multiple golf balls to achieve desired attributes suffers from at least several difficulties. Generally, the construction of known golf balls requires that a wide range of design variables such as layer arrangement, materials used in each layer, and layer thickness be changed to provide the various golf balls having different attributes.

Therefore, there is a need in the art for a system and method for providing a golf ball with configurable materials that is capable of being modified to have different attributes, including physical properties and/or play characteristics.

SUMMARY

In one aspect, the invention provides a method of post production modification of a golf ball, the method comprising: producing a golf ball comprising at least two configurable materials; exposing the golf ball to energy from an energy source; and wherein the golf ball undergoes a physical change in structure when at least one of the two configurable materials is exposed to the energy from the energy source.

In another aspect, the invention provides a kit of parts, the kit of parts including: at least one golf ball containing one or more configurable materials; and instructions for customizing a golf ball using one or more energy sources.

In another aspect, the invention provides a system for the post production modification of a stock golf ball, the system comprising: a first location configured to manufacture at least one group of stock golf balls containing one or more configurable materials; a second location configured to perform post production modification on the at least one group of stock golf balls; and wherein the second location comprises at least one energy source, the energy source being configured to produce energy that interacts with at least one configurable material disposed in the at least one group of stock golf balls to cause the golf ball to undergo a physical change in structure.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 10 is a schematic view of an exemplary embodiment of a relation for changing playability characteristics of a golf ball containing configurable materials using various wavelengths of energy;

FIG. 11 is a schematic view of an exemplary embodiment of a relation for changing playability characteristics of a golf ball containing configurable materials using various types of energy sources and various exposure times;

DETAILED DESCRIPTION

Figure 1:
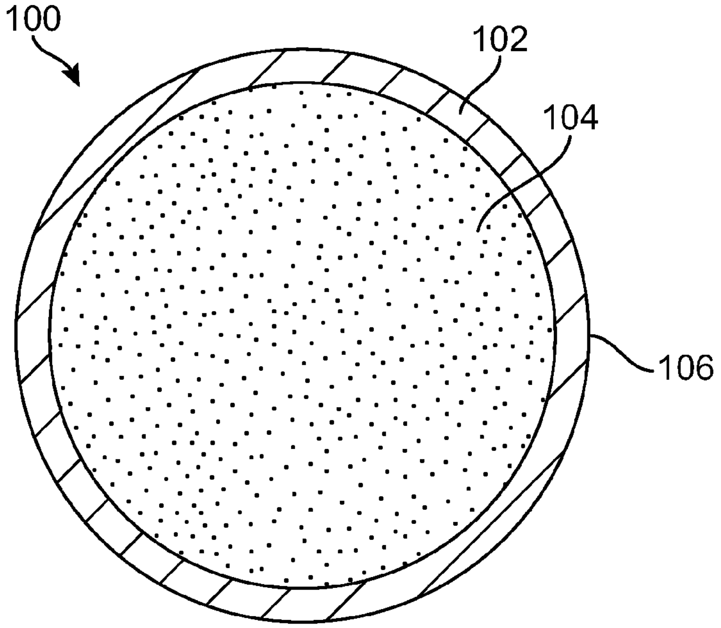
FIG. 1 is a cross-sectional view of an exemplary embodiment of a golf ball with configurable materials.

The embodiments described herein relate to one or more golf balls of various constructions, including constructions having multiple components and/or layers that are configurable using materials that change physical properties or attributes upon exposure to specific types of radiation. Using such configurable materials in the construction of a golf ball can provide a wide range of attributes for the golf ball by applying different post production modification processes. By applying a post production modification process to a stock golf ball, attributes of the stock golf ball may be changed to achieve different physical properties and/or play characteristics. With this arrangement, a large range of attributes for a golf ball may be provided to a consumer in accordance with his or her preferences in properties or play characteristics using a small number of distinct stock keeping units (SKUs).

For purposes of illustration, the golf balls shown in the Figures may be depicted with smooth covers. It should be understood, however, that the embodiments shown in the Figures and described in the various embodiments herein may include dimples, including dimple types, configurations, and/or arrangements as is known in the art.

Generally, golf balls can be made in various configurations and can be composed of a variety of materials. Golf balls configurations may include, but are not limited to one piece, two piece, three piece, and/or four piece and greater configurations. Each configuration includes a cover. In some cases, the cover material may include, but is not limited to urethane, balata, synthetic balata, Surlyn®, elastomer, and other materials. The inner composition of a golf ball may include a core, a mantle, and additional core or mantle layers, depending on whether the golf ball is a two piece, three piece, or four piece configuration. The inner composition of a golf ball may include a variety of materials including, but not limited to: natural rubber, balata, synthetic rubber, plastics, thermoplastics, polymers, elastomers, resins, and other materials and combinations of materials.

FIGS. 1 through 4 illustrate various different exemplary embodiments of a golf ball containing configurable materials. The term "configurable materials" as used throughout the specification and the claims refers to a group of materials that experience an irreversible physical change in structure in response to exposure to energy from an energy source. For example, thermoset and thermoplastic polymers are one type of configurable materials that undergo an irreversible physical change in structure in response to being exposed to an energy source, such as heat or radiation.

Generally, configurable materials may include materials that directly undergo an irreversible physical change in structure in response to a specific energy source, as well as materials which are a combination of one or more materials directly affected by an energy source entrained within materials that are heat labile and undergo polymerization when exposed to sufficient levels of heating. With this arrangement, configurable materials may include materials that directly or indirectly experience an irreversible physical change in structure in response to exposure to an energy source.

In some embodiments, configurable materials may include one or more materials, including, but not limited to: thermoset and thermoplastic polymers; unsaturated oligomers and/or monomers; gamma radiation labile materials, including unsaturated polymers; free radical materials, including acrylic oligomers; blocked materials, including blocked isocyanates that are labile to unblocking by heat; nitrogen blowing agents that are subject to activation by various levels of heat; high dipole moment molecules, including fatty acids such as stearic or oleic acid; and/or magnetic molecules entrained within heat labile materials that undergo polymerization upon heating. Configurable materials may be disposed alone or in combination with other configurable materials and/or non-configurable materials.

In some embodiments, various types of energy sources may be selected based on interaction with specific configurable materials. Different types of energy sources that may be used include, but are not limited to: heat, ultra violet light exposure, infrared exposure, gamma irradiation, microwave radiation, electron (e-beam) radiation, magnetic induction, as well as any other electromagnetic radiation. In other embodiments, different energy sources may be a substantially similar type of energy source, but may have different characteristics, such as wavelength, intensity, and/or time duration of exposure.

In the various embodiments described herein, configurable materials may be disposed in one or more layers of a golf ball. In some cases, configurable materials may comprise substantially all of one or more layers of a golf ball. In other cases, configurable materials may comprise a portion of one or more layers of the golf ball. In still other cases, configurable materials may be present in some layers and conventional materials may be present in some layers. In some embodiments, configurable materials may be disposed as solid material in one or more layers of a golf ball. In other embodiments, configurable materials may be disposed as liquid material in one or more layers of a golf ball. For example, in an exemplary embodiment, configurable materials may be disposed in a liquid core that is polymerized to various levels to provide varying viscosities to the liquid core. In addition to the present embodiments described below, it should be understood that any of the layers described in the present embodiments may be configured using conventional materials or configurable materials in accordance with the principles discussed herein.

Referring now to FIG. 1, in a first exemplary embodiment, a golf ball 100 may comprise a two piece configuration including a cover 102 and a core 104. In this embodiment, one or more of cover 102 and/or core 104 may comprise configurable materials. In an exemplary embodiment, core 104 may comprise a first configurable material that is affected by a first energy source. In another embodiment, cover 102 may comprise a second configurable material that is affected by a second energy source. In some cases, the first energy source and the second energy source may be different. In other cases, the first energy source and the second energy source may be the same. In still other cases, the first energy source and the second energy source may be the same type of energy source, but may have different characteristics, such as wavelength, intensity, and/or time duration of exposure.

In different embodiments, any one of cover 102 or core 104 not comprised of configurable materials may instead comprise various natural and synthetic materials conventionally used for golf ball composition. Further, in some embodiments, golf ball 100 may include a coating 106. Coating 106 may be one or more of paint, ink, clear coat, and other coating material disposed on the surface of golf ball 100. In some embodiments, coating 106 may include a configurable material such that coating 106 experiences an irreversible physical change in structure in response to exposure to an energy source. In some cases, coating 106 may be cured or hardened by selective exposure to an energy source. In other cases, coating 106 may include paint or ink that may be set or cured by selective exposure to an energy source. In other embodiments, coating 106 is optional and may be omitted.

Figure 2:
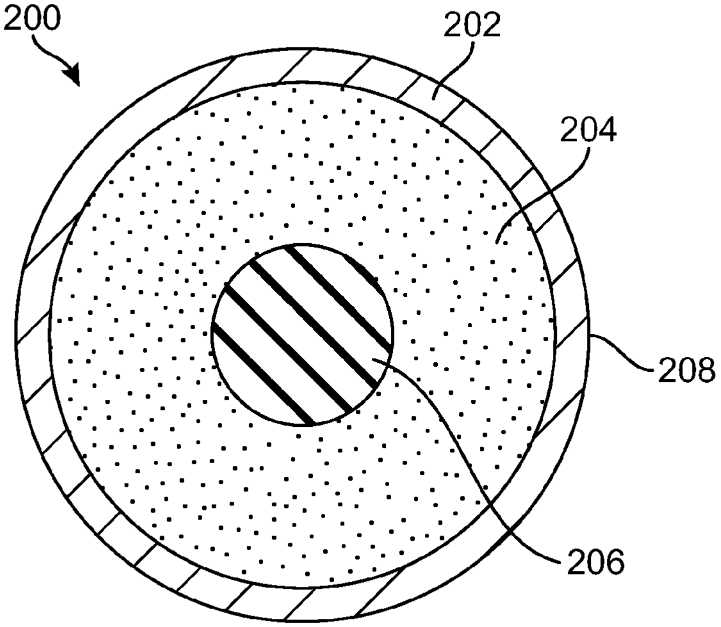
FIG. 2 is a cross-sectional view of an exemplary embodiment of a golf ball with configurable materials.

Referring to FIG. 2, in a second exemplary embodiment, a golf ball 200 may comprise a three piece configuration including a cover 202, a mantle layer 204, and a core 206. In this exemplary embodiment, one or more of cover 202, mantle layer 204, and/or core 206 may comprise configurable materials. In an exemplary embodiment, mantle layer 204 may comprise a first configurable material that is affected by a first energy source. In another embodiment, cover 202 may comprise a second configurable material that is affected by a second energy source. In another embodiment, core 206 may comprise a third configurable material that is affected by a third energy source. In some cases, the first energy source, the second energy source, and/or the third energy source may be different. In other cases, one or more of the first energy source, the second energy source, and/or the third energy source may be the same. In still other cases, two or more of the first energy source, the second energy source, and/or the third energy source may be the same type of energy source, but may have different characteristics, such as wavelength, intensity, and/or time duration of exposure.

In different embodiments, any of cover 202, mantle layer 204, or core 206 not comprised of configurable materials may instead comprise various natural and synthetic materials conventionally used for golf ball composition. Golf ball 200 may further include a coating 208. Coating 208 may be a conventional coating or may be comprised of configurable materials, including any of the materials described above in regard to coating 106. In other embodiments, coating 208 is optional and may be omitted.

Figure 3:
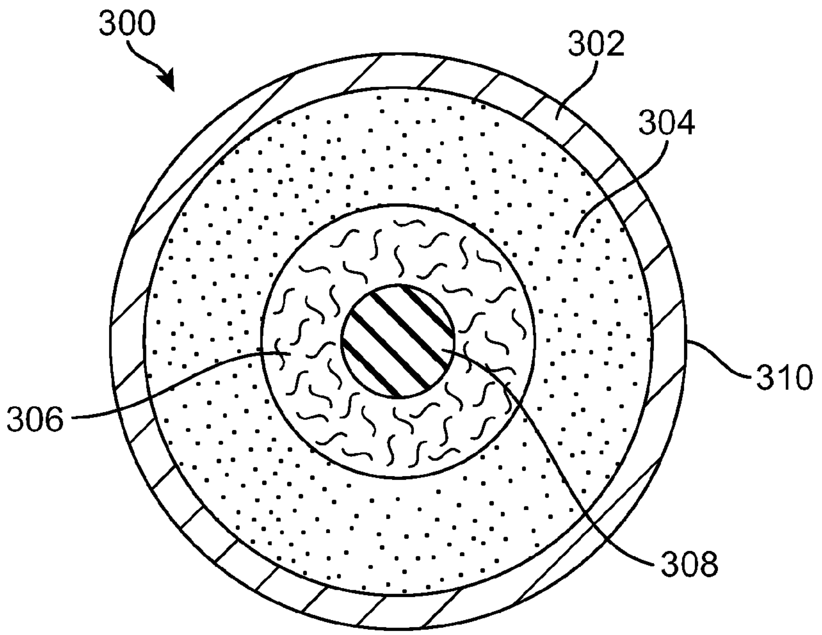
FIG. 3 is a cross-sectional view of an exemplary embodiment of a golf ball with configurable materials.

Referring now to FIG. 3, in a third exemplary embodiment, a golf ball 300 may comprise a four piece configuration including a cover 302, an outer mantle layer 304, an inner mantle layer 306, and a core 308. In this exemplary embodiment, one or more of cover 302, outer mantle layer 304, inner mantle layer 306, and/or core 308 may comprise configurable materials. In one embodiment, cover 302 may comprise a first configurable material that is affected by a first energy source. In this embodiment, cover 302 may comprise an unsaturated oligomer that when exposed to e-beam radiation from the first energy source will allow the unsaturated bonds to crosslink with available free radical material, including the oligomer itself.

In an exemplary embodiment, outer mantle layer 304 may comprise a second configurable material that is affected by a second energy source. In this embodiment, outer mantle layer 304 may comprise a high dipole moment material, including a fatty acid, such as oleic or stearic acids, that is configured to heat upon exposure to microwave radiation from the second energy source. The high dipole moment material is configured to heat up due to increased molecular vibration. In addition, outer mantle layer 304 may further comprise a heat labile material. The heat labile material may be configured to polymerize in response to the heating of the high dipole moment material entrained within the heat labile material when exposed to microwave radiation.

In one embodiment, inner mantle layer 306 may comprise a third configurable material that is affected by a third energy source. In this embodiment, inner mantle layer 306 may comprise a magnetic material that will be affected by a magnetic induction field. The magnetic material may be configured to heat up and change the structural properties of inner mantle layer 306 in response to exposure to the magnetic induction field.

In another embodiment, core 308 may comprise a fourth configurable material that is affected by a fourth energy source. In this embodiment, core 308 may comprise a gamma radiation labile material that is configured to crosslink when exposed to gamma radiation.

In some embodiments, each of the first energy source, the second energy source, the third energy source, and/or the fourth energy sources may be different. In other embodiments, one or more of the first energy source, the second energy source, the third energy source, and/or the fourth energy source may be the same. In still other embodiments, two or more of the first energy source, the second energy source, the third energy source, and/or the fourth energy source may be the same type of energy source, but may have different characteristics, such as wavelength, intensity, and/or time duration of exposure.

In different embodiments, any of cover 302, outer mantle layer 304, inner mantle layer 306, or core 308 not comprised of configurable materials may instead comprise various natural and synthetic materials conventionally used for golf ball composition. Golf ball 300 may further include a coating 310. Coating 310 may be a conventional coating or may be comprised of configurable materials, including any of the materials described above in regard to coating 106. In other embodiments, coating 310 is optional and may be omitted.

Figure 4:
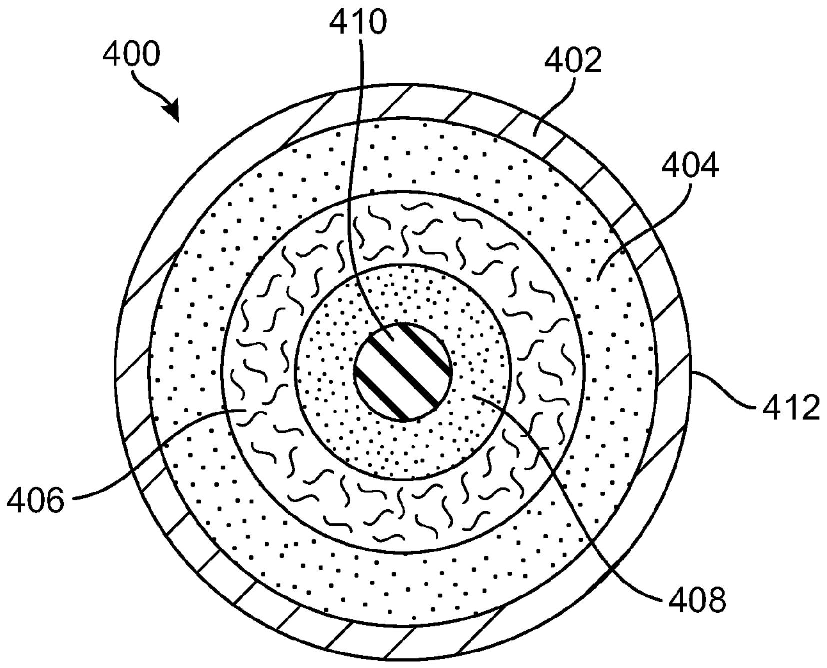
FIG. 4 is a cross-sectional view of an exemplary embodiment of a golf ball with configurable materials.

Referring now to FIG. 4, in a four exemplary embodiment, a golf ball 400 may comprise a five piece configuration including a cover 402, an outer mantle layer 404, an inner mantle layer 406, an outer core 408, and an inner core 410. In this exemplary embodiment, one or more of cover 402, outer mantle layer 404, inner mantle layer 406, outer core 408, and/or inner core 410 may comprise configurable materials. In one embodiment, golf ball 400 may be substantially similar to golf ball 300, including substantially similar configurable materials associated with each of the corresponding layers and with inner core 410 comprising a substantially similar configurable material as core 308, described above. In this embodiment, however, outer core 408 comprises an additional layer within golf ball 400 that may comprise configurable materials, as compared with golf ball 300. With this arrangement, golf ball 400 may be configured to provide additional changes to attributes of the golf ball using post production modification, as discussed in more details below.

In an exemplary embodiment, at least one layer of golf ball 400 may be comprised of a substantially similar configurable material as one of the other layers disposed in golf ball 400. In this embodiment, outer core 408 may be comprised of a substantially similar configurable material as outer mantle layer 404. Accordingly, in this embodiment, each of outer mantle layer 404 and outer core 408 may be configured to be affected by the same energy source. For example, in one embodiment, each of outer mantle layer 404 and outer core 408 may comprise a high dipole moment material, as described above in regard to outer mantle layer 304, that is configured to heat upon exposure to microwave radiation from the same energy source. The high dipole moment material is configured to heat up due to increased molecular vibration. In addition, each of outer mantle layer 404 and outer core 408 may further comprise a heat labile material that is configured to polymerize in response to the heating of the high dipole moment material entrained within the heat labile material when exposed to microwave radiation.

In some cases, both of outer mantle layer 404 and outer core 408 may be affected by exposure to the same energy source to the same extent. In other words, both outer mantle layer 404 and outer core 408 may be configured to undergo the same change in structure in response to the same amount and/or duration of exposure to the energy source. In other cases, due to the relative positions of outer mantle layer 404 and outer core 408 within golf ball 400, each of outer mantle layer 404 and outer core 408 may be configured to undergo different amounts of change in response to the same amount and/or duration of exposure to the energy source. Accordingly, due to a relative location closer to the exterior surface of golf ball 400, outer mantle layer 404 may be configured to undergo a greater amount of structural change than outer core 408 in response to the same exposure to the energy source. In addition, the amount of structural change affecting each of outer mantle layer 404 and outer core 408 may be varied by adjusting the strength of intensity and/or time duration of exposure to the energy source accordingly.

In different embodiments, any of cover 402, outer mantle layer 404, inner mantle layer 406, outer core 408, or inner core 410 not comprised of configurable materials may instead comprise various natural and synthetic materials conventionally used for golf ball composition. Golf ball 400 may further include a coating 412. Coating 412 may be a conventional coating or may be comprised of configurable materials, including any of the materials described above in regard to coating 106. In other embodiments, coating 412 is optional and may be omitted.

In addition to the embodiments illustrated in FIGS. 1 through 4 and described above, it should be understood that a golf ball having any number of layers, including configurable materials or conventional materials, or a combination thereof, may be made using the principles described above.

Figure 5:
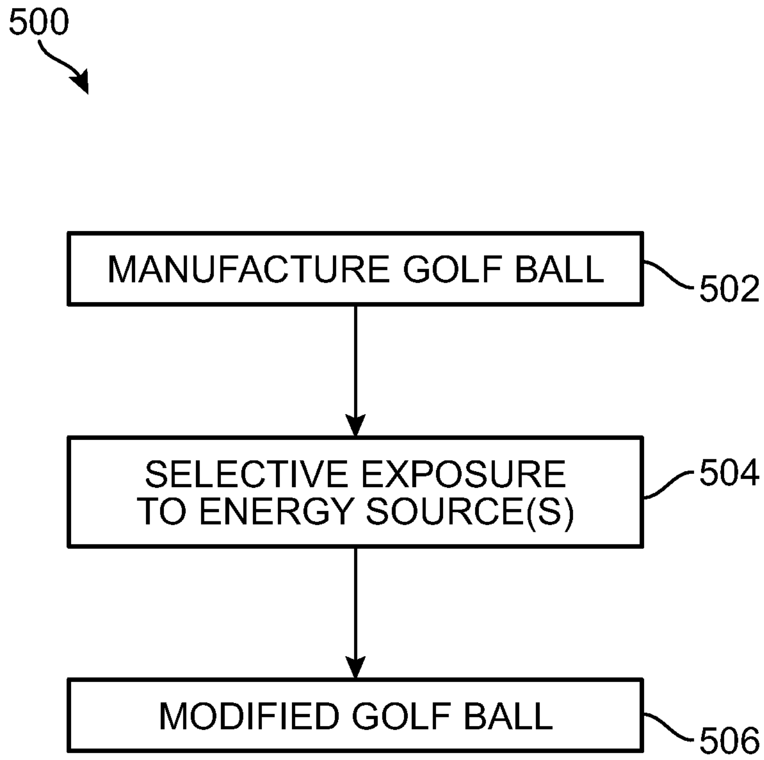
FIG. 5 is a representational view of an exemplary embodiment of a process for modifying a golf ball containing configurable materials.

Referring now to FIG. 5, an exemplary embodiment of a process 500 for modifying a golf ball containing configurable materials is illustrated. In some embodiments, golf balls may be manufactured using configurable materials so that the golf balls are associated with a first set of attributes, including specific physical properties or play characteristics. The golf balls may be modified with one or more energy sources according to a method of a post production modification that changes the physical structure of the configurable materials within the golf balls so that the modified golf balls are associated with a second set of attributes, including different specific physical properties or play characteristics. With this arrangement, the golf balls are capable of being played with the first set of attributes without any post production modification or, with the second set of attributes, after post production modification.

In an exemplary embodiment of process 500 for modifying a golf ball containing configurable materials, one or more golf balls are manufactured at a first step 502. Golf balls manufactured during step 502 include golf balls containing configurable materials, including any of golf ball 100, golf ball 200, golf ball 300, and/or golf ball 400, described above, as well as any other type of golf ball containing configurable materials or a combination of configurable materials and conventional materials. In one embodiment, the golf balls manufactured at step 502 may be associated with a first set of attributes. As described above, first set of attributes may include any combination of physical properties and/or play characteristics. After manufacture of the golf balls at step 502, the golf balls with the first set of attributes are capable of being used to play golf by consumers. In some cases, the first set of attributes associated with the golf balls manufactured at step 502 may be the desired attributes of a particular consumer.

In other cases, however, a consumer may desire a golf ball that exhibits a different set of attributes than the first set of attributes. Accordingly, in an exemplary embodiment, one or more of the golf balls manufactured at step 502 may be selectively exposed to one or more energy sources at step 504 to modify the attributes of the golf balls. In one embodiment, one or more energy sources may be selected at step 504 based on the specific configurable materials included in the golf balls manufactured at step 502 and/or based on the necessary physical structure changes to attain the desired set of modified attributes.

Upon exposure to the energy source or energy sources at step 504, the golf balls manufactured at step 502 will have undergone a physical change in structure. As a result, the modified golf balls at step 506 have been changed so as to exhibit a second set of attributes, including a combination of physical properties and/or play characteristics that are different from the first set of attributes, described above. In addition, by varying the selective exposure to energy sources at step 504, modified golf balls at step 506 may be modified in different ways to attain multiple different set of attributes. With this arrangement, a consumer may obtain a golf ball that exhibits a desired set of attributes by applying a post production modification process to a manufactured golf ball.

Figure 6:
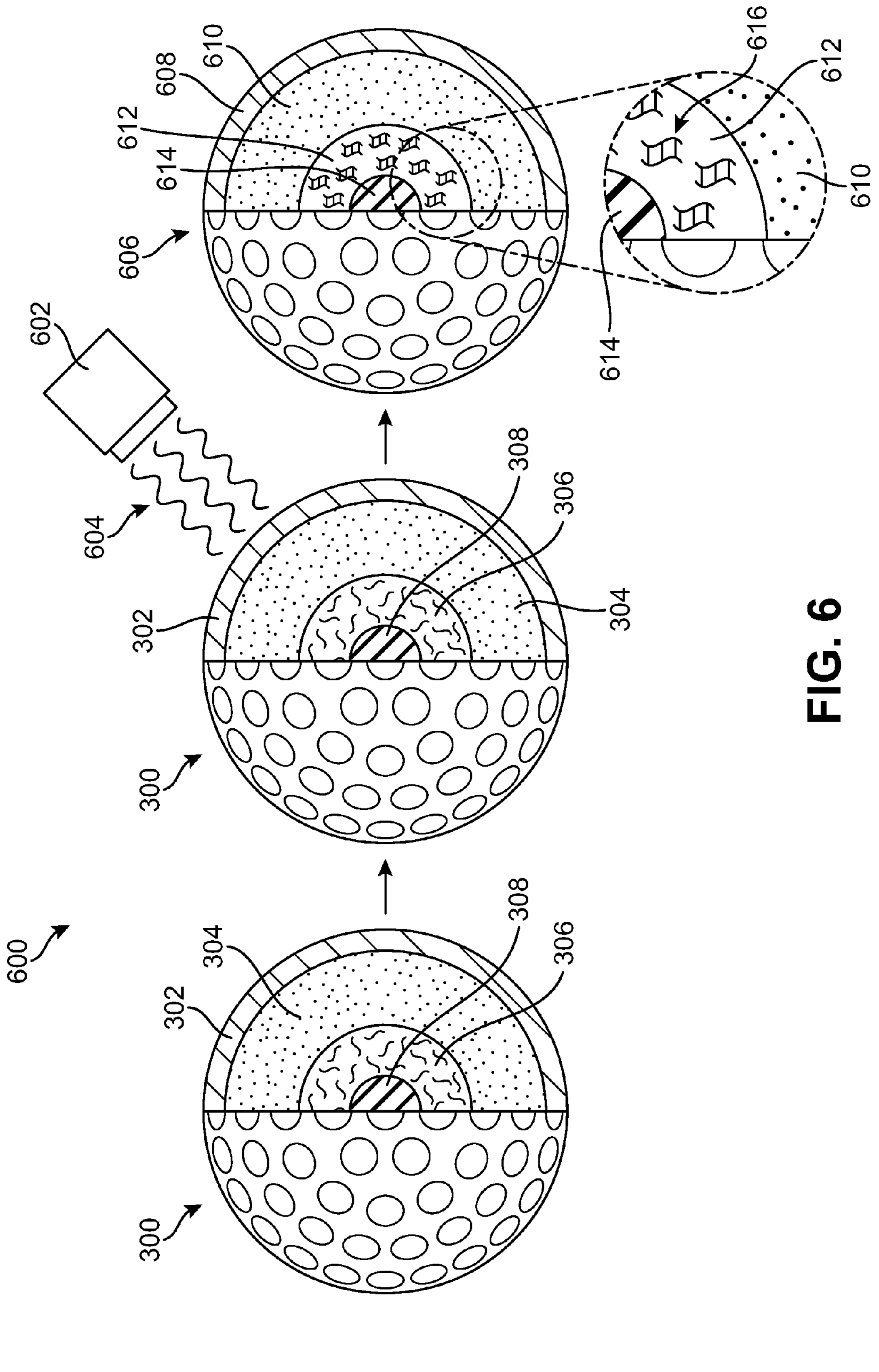
FIG. 6 is a schematic view of an exemplary embodiment of a golf ball containing configurable materials being modified using an energy source.
Figure 7:
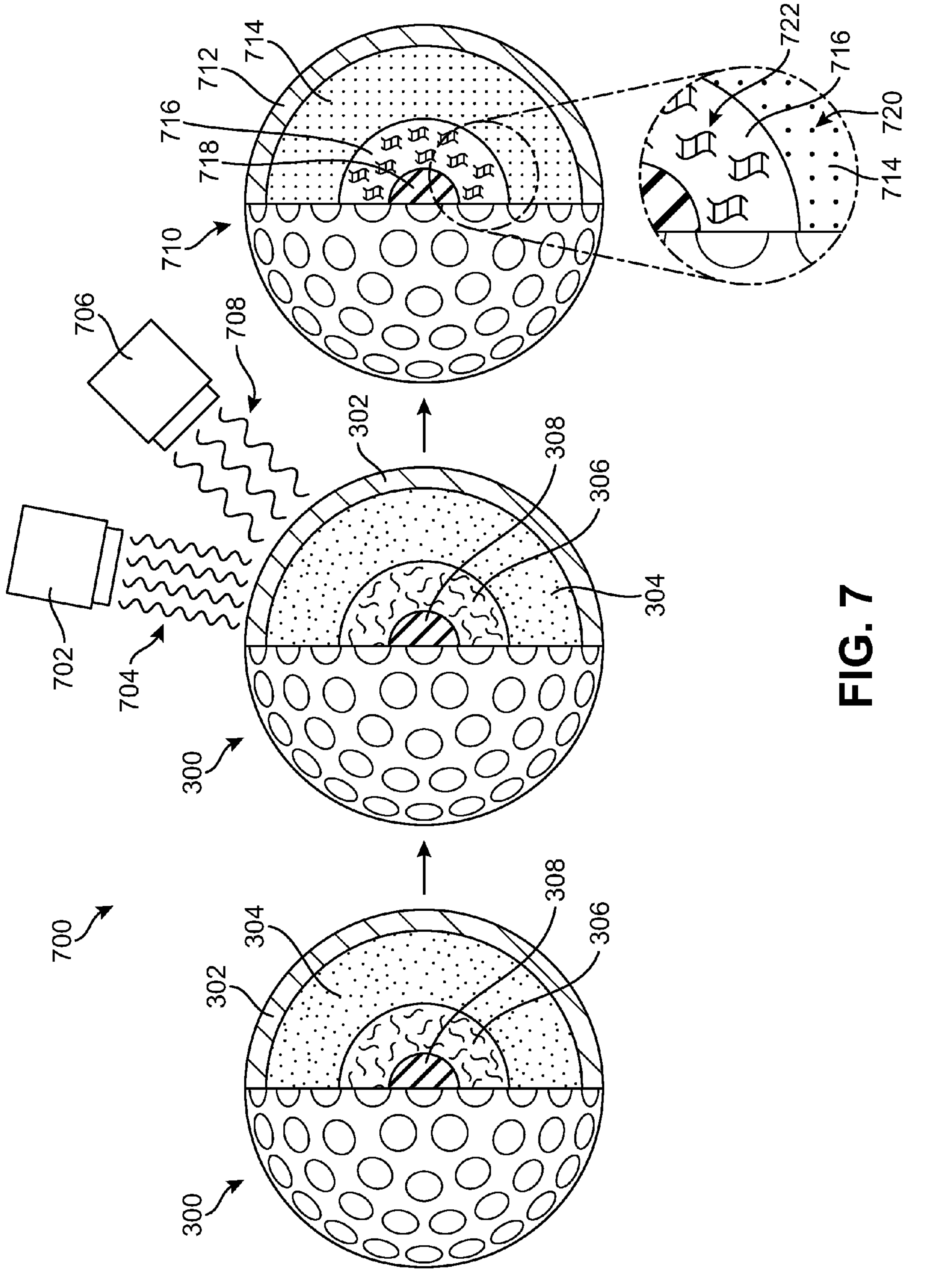
FIG. 7 is a schematic view of an exemplary embodiment of a golf ball containing configurable materials being modified using multiple energy sources.

FIGS. 6 and 7 illustrate schematic views of exemplary embodiments of a golf ball containing configurable materials being modified using a single energy source and multiple energy sources as part of post production modification processes. It should be understood that FIGS. 6 and 7 are merely exemplary and any number of energy sources may be used in combination with any golf ball containing configurable materials described herein.

Referring now to FIG. 6, golf ball 300 is illustrated undergoing a post production modification process 600 using an energy source to affect a physical structural change in at least one layer. In this embodiment, golf ball 300 may include one or more layers comprising configurable materials, including cover 302, outer mantle layer 304, inner mantle layer 306, or core 308, as described above. As shown in FIG. 6, the physical structure of one or more portions of golf ball 300 may be modified using post production modification process 600 by exposing golf ball 300 to an energy source 602. In some embodiments, energy source 602 may be any source of energy 604 that is configured to interact with one or more configurable materials in golf ball 300. In an exemplary embodiment, energy source 602 may be further configured so that energy 604 interacts with a selective one of the configurable materials, while having no effect on other configurable materials.

In this embodiment, energy source 602 may be selected so that energy 604 interacts with configurable materials disposed within inner mantle layer 306. In some embodiments, the remaining layers, including cover 302, outer mantle layer 304, and/or core 308 may be configured to be inert to energy 604. In some cases, cover 302, outer mantle layer 304, and/or core 308 may be comprised of configurable materials that do not react with energy 604. In other cases, cover 302, outer mantle layer 304, and/or core 308 may be comprised of conventional materials.

In an exemplary embodiment, inner mantle layer 306 may be comprised of an unsaturated oligomer material and energy source 602 may be an electron gun configured to produce e-beam radiation as energy 604. In this case, when golf ball 300 is exposed to energy source 602, energy 604 interacts with the configurable materials in inner mantle layer 306. In one embodiment, the e-beam radiation associated with energy 604 will allow the unsaturated bonds in the oligomer material contained in inner mantle layer 306 to crosslink with available free radical material, including the oligomer itself. Meanwhile, the respective materials associated with one or more of cover 302, outer mantle layer 304, and/or core 308 remain substantially unchanged.

In some embodiments, the exposure of golf ball 300 to energy source 602 may physically change the structure of one or more layers of golf ball 300 such that it has attained a new set of attributes as a modified golf ball 606. In this embodiment, energy 604 from energy source 602 has affected a change in the physical structure of configurable materials in modified inner mantle layer 612. Modified inner mantle layer 612 comprises configurable material that has been changed by energy 604 such that unsaturated bonds crosslinked with free radicals, shown representationally as modified configurable material 616 within modified inner mantle layer 612.

In this embodiment, energy source 602 has been selected so as to not substantially react with any of the materials comprising the remaining layers, including cover 302, outer mantle layer 304, and/or core 308. As a result, modified golf ball 606 includes cover 608, outer mantle layer 610, and core 614 that remain substantially similar in physical structure to cover 302, outer mantle layer 304, and core 308 of golf ball 300 prior to exposure to energy 604 from energy source 602.

Referring now to FIG. 7, golf ball 300 is illustrated undergoing a post production modification process 700 using multiple energy sources to affect a physical structural change in two or more layers. In this embodiment, golf ball 300 may include two or more layers comprising configurable materials, including cover 302, outer mantle layer 304, inner mantle layer 306, or core 308, as described above. As shown in FIG. 7, the physical structure of one or more portions of golf ball 300 may be modified using post production modification process 700 by exposing golf ball 300 to a first energy source 702 and a second energy source 706. In some embodiments, post production modification process 700 may include simultaneous exposure of golf ball 300 to first energy source 702 and second energy source 706. In other embodiments, post production modification process 700 may include exposure of golf ball 300 to first energy source 702 and second energy source 706 in a predetermined sequence, including various predetermined exposure times and amounts.

In some embodiments, first energy source 702 may be any source of first energy 704 that is configured to interact with one or more configurable materials in golf ball 300. In an exemplary embodiment, first energy source 702 may be further configured so that first energy 704 interacts with a selective one of the configurable materials, while having no effect on the other configurable materials. Similarly, second energy source 706 may be any source of second energy 708 that is configured to interact with one or more configurable materials in golf ball 300. In some cases, second energy source 706 may be configured to produce second energy 708 that interacts with a different configurable material contained in golf ball 300 than first energy 704. In addition, second energy source 706 may be further configured so that second energy 708 interacts with a selective one of the configurable materials, while having no effect on the other configurable materials.

In some embodiments, first energy source 702 and second energy source 706 may be configured to produce different types of energy. In one embodiment, first energy source 702 may be configured to produce microwave radiation as first energy 704 and second energy source 706 may be configured to produce gamma radiation as second energy 708. In other embodiments, first energy source 702 and second energy source 706 may be configured to produce different wavelengths of the same type of radiation. In one embodiment, first energy source 702 may be configured to produce electromagnetic radiation associated with a first wavelength as first energy 704 and second energy source 706 may be configured to produce electromagnetic radiation associated with a second wavelength as second energy 708. In addition, in other embodiments, the strength or intensity, as well as duration of exposure to each energy, may be varied.

In this embodiment, first energy source 702 may be selected so that first energy 704 interacts with configurable materials disposed within outer mantle layer 304. In some embodiments, the remaining layers, including cover 302, inner mantle layer 306, and/or core 308 may be configured to be inert to first energy 704. Similarly, in this embodiment, second energy source 706 may be selected so that second energy 708 interacts with configurable materials disposed within inner mantle layer 306. In some embodiments, the remaining layers, including cover 302, outer mantle layer 304, and/or core 308 may be configured to be inert to second energy 708. In some cases, cover 302 and/or core 308 may be comprised of configurable materials that do not react with either of first energy 704 or second energy 708. In other cases, cover 302 and/or core 308 may be comprised of conventional materials.

In an exemplary embodiment, outer mantle layer 304 may be comprised of a high dipole moment material and first energy source 702 may be a microwave radiation source configured to produce microwave radiation as first energy 704. In this case, the high dipole moment material disposed within outer mantle layer 304 is configured to heat up due to increased molecular vibration caused by microwave radiation associated with first energy 704 from first energy source 702. In addition, outer mantle layer 304 furthers comprise a heat labile material that is configured to polymerize in response to the heating of the high dipole moment material entrained within the heat labile material when exposed to the microwave radiation associated with first energy 704. With this arrangement, outer mantle layer 304 undergoes a physical change in structure upon exposure to first energy 704 from first energy source. Meanwhile, the respective materials associated with one or more of cover 302, inner mantle layer 306, and/or core 308 remain substantially unchanged.

In an exemplary embodiment, inner mantle layer 306 may be comprised of an unsaturated oligomer material and second energy source 706 may be an electron gun configured to produce e-beam radiation as second energy 708, as described above. In this case, when golf ball 300 is exposed to second energy source 706, second energy 708 interacts with the configurable materials in inner mantle layer 306. As described above, the e-beam radiation associated with second energy 708 will allow the unsaturated bonds in the oligomer material contained in inner mantle layer 306 to crosslink with available free radical material, including the oligomer itself. Meanwhile, the respective materials associated with one or more of cover 302, outer mantle layer 304, and/or core 308 remain substantially unchanged.

In some embodiments, the exposure of golf ball 300 to first energy source 702 and second energy source 706 may physically change the structure of one or more layers of golf ball 300 such that it has attained a new set of attributes as a modified golf ball 710. In this embodiment, first energy 704 from first energy source 702 has affected a change in the physical structure of configurable materials in modified outer mantle layer 714. Modified outer mantle layer 714 comprises configurable material that has been changed by first energy 704 such that the configurable material has undergone polymerization, shown representationally as modified configurable material 720 within modified outer mantle layer 714.

In this embodiment, second energy 708 from second energy source 706 has affected a change in the physical structure of configurable materials in modified inner mantle layer 716. Modified inner mantle layer 716 comprises configurable material that has been changed by second energy 706 such that unsaturated bonds crosslinked with free radicals, shown representationally as modified configurable material 722 within modified inner mantle layer 716.

In this embodiment, first energy source 702 and second energy source 706 have been selected so as to not substantially react with any of the materials comprising the remaining layers, including cover 302 and/or core 308. As a result, modified golf ball 710 includes cover 712 and core 718 that remain substantially similar in physical structure to cover 302 and core 308 of golf ball 300 prior to exposure to first energy 704 from first energy source 702 and second energy 708 from second energy source 706.

In some embodiments, a post production modification process may be used on a golf ball containing configurable materials to cause a physical change in one or more layers of the golf ball to change the attributes associated with the golf ball, including physical properties and play characteristics. By selectively exposing configurable material contained in a golf ball to one or more specific energy sources, as discussed above, the physical properties and play characteristics of a golf ball may be changed, including, but not limited to: hardness, amount of deformation, ball speed, backspin, sidespin, total spin, and other parameters associated with a golf ball. With this arrangement, attributes of a golf ball, including physical property, club face impact characteristics and/or flight path characteristics may be permanently and irreversibly altered after production of the golf ball.

Figure 8:
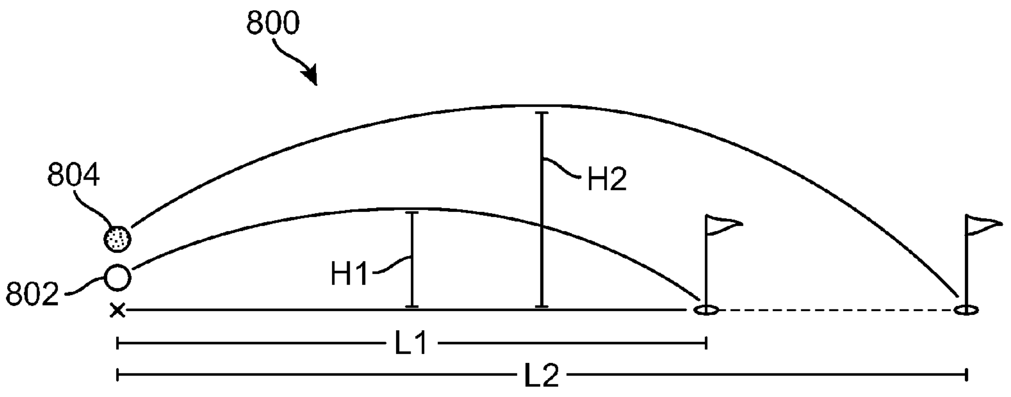
FIG. 8 is a representational view of an exemplary embodiment of changed playability characteristics of a modified golf ball.
Figure 9:
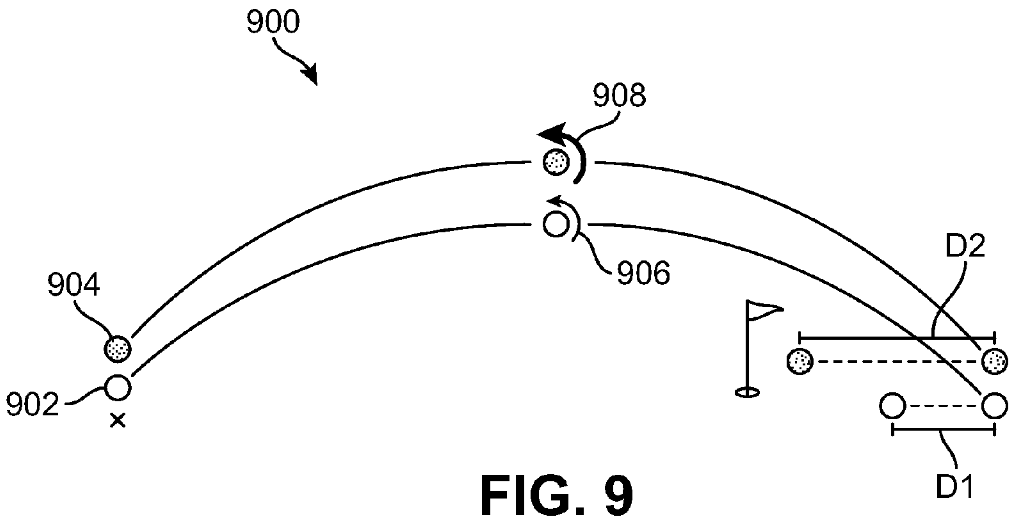
FIG. 9 is a representational view of an exemplary embodiment of changed playability characteristics of a modified golf ball.

Referring now to FIGS. 8 and 9, representational views of exemplary embodiments of changed physical properties and/or play characteristics of a modified golf ball compared with a stock golf ball are illustrated. In some embodiments, a golf ball containing configurable materials may be initially manufactured as a stock golf ball associated with a first set of attributes. In an exemplary embodiment, the first set of attributes associated with the stock golf ball may be changed by using a post production modification process to modify the golf ball, as described above.

In one embodiment, at least one of a physical property and/or a play characteristic of a stock golf ball may be changed using a post production modification process. Referring to FIGS. 8 and 9, at least one of a ball speed and/or a spin rate may be affected by selectively exposing configurable materials in a stock golf ball to one or more energy sources. Ball speed is the measurement of the velocity of a golf ball after impact with a club head of a golf club. Because ball speed is proportional to the force of the impact of the club head with the golf ball, the ball speed may be increased by modifying the stock golf ball to have a greater hardness.

The spin of a golf ball is the rotation of a golf ball while in flight. Spin includes rotation against the direction of flight, i.e., backspin, and rotation sideways to the direction of spin, i.e., side spin. Total spin is the vector addition of backspin and side spin. The spin rate of a golf ball is the speed that the golf ball rotates on its axis while in flight. Typically, the spin rate is measured in revolutions per minute (rpm). The spin of a golf ball is related to an amount of deformation of the golf ball. The amount of deformation of the golf ball may vary based on the hardness of the golf ball, whereby a harder golf ball generally will deform less than a softer golf ball. A harder golf ball may generally achieve greater distances but have less spin. On the other hand, a softer golf ball may generally experience more spin, but will lack distance. Based on the selective exposure of configurable materials contained in a golf ball to specific energy sources, the hardness may be changed, thus affecting the deformation amount and changing the spin rate of the golf ball.

FIG. 8 illustrates a comparison 800 of the flight paths of a stock golf ball 802 containing configurable materials associated with a first set of attributes and a modified golf ball 804 containing configurable materials associated with a second set of attributes that has been modified using a post production modification process according to the methods described herein. As shown in FIG. 8, stock golf ball 802 may have a first flight path terminating at an end point associated with a first distance L1 and also may be associated with a loft corresponding to a first height H1. In contrast, modified golf ball 804 including configurable materials that have been modified by selective exposure to one or more specific energy sources to change the play characteristics may have an exemplary flight path terminating at an end point associated with a second distance L2. Modified golf ball 804 also may be associated with a loft corresponding to a second height H2.

In some embodiments, by using the systems and methods described herein to change the physical structure of the configurable material in stock golf ball 802, parameters associated with a flight path of golf ball may be changed or altered. In an exemplary embodiment, by selective application of an energy source to the configurable material included in modified golf ball 804 as described herein, second distance L2 may be greater than first distance L1 associated with stock golf ball 802. Similarly, second height H2 associated with the loft of modified golf ball 804 may be greater than first height H1 associated with the loft of stock golf ball 802.

In other embodiments, by using a post production modification process according to the methods described herein, attributes associated with other characteristics of a flight path of golf ball may be changed or altered. FIG. 9 illustrates a comparison 900 of the flight paths of a stock golf ball 902 containing configurable materials associated with a first set of attributes and a modified golf ball 904 containing configurable materials associated with a second set of attributes that has been modified using a post production modification process according to the methods described herein to increase the amount of spin imparted to modified golf ball 904.

As shown in FIG. 9, stock golf ball 902 may have a first amount of spin 906. In this embodiment, first amount of spin 906 may be associated with stock golf ball 902 rolling backwards a first distance D1 towards an end point. In contrast, modified golf ball 904 including configurable materials that have been modified by selective exposure to one or more specific energy sources to change the play characteristics may have a second amount of spin 908. In this embodiment, second amount of spin 908 may be associated with modified golf ball 904 rolling backwards a second distance D2 towards an end point.

In some embodiments, by using the systems and methods described herein to change the physical structure of the configurable material in stock golf ball 902, parameters associated with a flight path of golf ball may be changed or altered. In an exemplary embodiment, by selective application of an energy source to the configurable material included in modified golf ball 904 as described herein, second distance D2 may be greater than first distance D1 associated with stock golf ball 902.

In addition, other attributes may be changed from a stock golf ball to a modified golf ball by using a post production modification process to change the physical structure of one or more configurable materials in the stock golf ball to change the physical properties and/or the play characteristics of the modified golf ball to suit the desired performance of a consumer.

FIGS. 10 and 11 illustrate exemplary representative correlations between attributes associated with a golf ball and selective exposure of configurable materials to one or more energy sources according to the present post production modification process. Using such a post production modification process, the attributes of a stock golf ball containing configurable materials may be changed to correspond to desired physical properties and/or play characteristics associated with the modified golf ball.

Referring now to FIG. 10, a representative correlation 1000 between wavelength associated with an energy source and one or more attributes of a golf ball is illustrated. In some embodiments, a wavelength 1002 may be a range of wavelengths associated with a single energy source. In other embodiments, wavelength 1002 may be different wavelengths associated with different energy sources. For example, in one embodiment, wavelength 1002 may be associated with a range of wavelengths associated with a source of electromagnetic radiation. In another embodiment, wavelength 1002 may be one or more different types of electromagnetic radiation, including radio, microwave, IR, UV, and other electromagnetic radiation.

In some embodiments, multiple attributes associated with a golf ball containing configurable materials may be changed by selective exposure to energy sources using the post production modification process described herein. FIG. 10 illustrates exemplary attributes associated with a golf ball, including coefficient of restitution (COR) 1004, spin 1006, and hardness 1008. In an exemplary embodiment, selected energy from an energy source may be configured to target configurable materials disposed within discrete layers or portions of a stock golf ball. However, the relationship between changing the physical structure of a particular layer may not be perfectly correlated to a specific desired change in a physical property or play characteristic associated with the golf ball. As a result, a change to one or more configurable materials within the golf ball may have varying changes to multiple properties and/or play characteristics associated with the modified golf ball.

In some cases, a particular wavelength of energy may be associated with a large change in one of a physical property and/or play characteristic, while simultaneously being associated with either a small change or no change in another physical property and/or play characteristics. In this embodiment, exposure of a stock golf ball containing configurable materials to a first wavelength 1010 may affect a large change in COR 1004 and a relatively smaller change in spin 1006. In addition, first wavelength 1010 may be configured to have no effect on hardness 1008 of the stock golf ball. In this embodiment, selective exposure of the stock golf ball containing configurable materials to a second wavelength 1020 may have a different effect on the attributes of the golf ball. In this embodiment, second wavelength 1020 may affect a large change in spin 1006 and a relatively smaller change in COR 1004 and/or hardness 1008.

Similarly, selective exposure of the stock golf ball to a third wavelength 1030 may have different effects on the attributes of the stock golf ball as either first wavelength 1010 and/or second wavelength 1020. In this embodiment, third wavelength 1030 may be configured to have no effect on the COR 1004 of the stock golf ball, while causing a relatively large change in hardness 1008. In addition, third wavelength 1030 may also have a relatively smaller effect on spin 1006 of the stock golf ball.

In other embodiments, different wavelengths of one or more energy sources may be used to change additional attributes associated with a stock golf ball containing configurable materials other than those shown in FIG. 10. In some cases, the correlation 1000 may be generated by obtaining test data using a ball hitting machine to measure the relationship between energy exposure and the effect on each of the attributes associated with the golf ball. In other cases, the effect of the particular wavelength of energy on a particular attribute may be derived mathematically using algorithms or formulas or using software to model the relationships.

In another embodiment, one or more specific types of energy sources may be associated with a change in a specific attribute. FIG. 11 illustrates a representative correlation 1100 between a specific energy source and one or more attributes of a golf ball. In an exemplary embodiment, changes in attributes associated with a golf ball, including coefficient of restitution (COR) 1104, spin 1106, and hardness 1108, may be linked to exposure to energy from a specific energy source. In this embodiment, a change in COR 1104 may correlated to exposure to energy from a first energy source. Similarly, a change in spin 1106 may be correlated to exposure to energy from a second energy source and/or a change in hardness may be correlated to exposure to energy from a third energy source.

In some embodiments, the amount or degree of change to the specific attribute may be related to an exposure time 1102 associated with the energy from a specific energy source. In an exemplary embodiment, varying the length of exposure time 1102 that the stock golf ball is exposed to the energy from a specific energy source may vary the amount of the effect on the configurable material associated with a specific energy source. As shown in FIG. 11, correlation 1100 may include various time durations of exposure time 1102 associated with the energy from the specific energy in order to affect a related amount or degree of change in the associated attribute. In some cases, varying exposure time 1102 may have a multiplicative effect on the attribute. In this embodiment, COR 1104 may be changed a predetermined amount by exposing the stock golf ball to energy from a first energy source for a first exposure time 1110. By increasing the exposure time from first exposure time 1110 to a second exposure time 1120, the effect on the change in COR 1104 may be doubled. Similarly, by exposing the stock golf ball to the energy from the first energy source for a third exposure time 1130, the change in COR 1104 may be tripled over the change affected by first exposure time 1110.

In other embodiments, the relationship between exposure time 1102 and change in the related attribute may be different. In another embodiment, increased exposure time may have a slight additive effect, rather than a multiplicative effect. For example, in this embodiment, spin 1106 may be changed a predetermined amount by exposing the stock golf ball to energy from a second energy source for a first exposure time 1110. By increasing the exposure time from first exposure time 1110 to a second exposure time 1120, the effect on the change in spin 1106 may be increased by a predetermined amount. Similarly, by exposing the stock golf ball to the energy from the second energy source for a third exposure time 1130, the change in spin 1106 may be increased by a larger predetermined amount over the change affected by first exposure time 1110 and/or second exposure time 1120.

In still other embodiments, increased exposure time may have a specific predetermined change in the related attribute, rather than an additive or multiplicative effect. For example, in this embodiment, hardness 1108 may be changed to a first predetermined constant value A by exposing the stock golf ball to energy from a third energy source for a first exposure time 1110. By increasing the exposure time from first exposure time 1110 to a second exposure time 1120, the effect on the change in hardness 1108 may be changed to a second predetermined constant value B. In some cases, second predetermined constant value B may be larger than first predetermined constant value A. In other cases, however, second predetermined constant value B may be smaller than first predetermined constant value A. Similarly, by exposing the stock golf ball to the energy from the third energy source for a third exposure time 1130, the change in hardness may be changed to a third predetermined constant value C. In some cases, third predetermined constant value C may be larger than either or both of second predetermined constant value B and/or first predetermined constant value A. In other cases, however, third predetermined constant value C may be smaller than either second predetermined constant value B and/or first predetermined constant value A. For example, in one embodiment increasing exposure time 1102 beyond first exposure time 1110 and/or second exposure time 1120, may cause hardness 1108 to decrease, rather than increase.

It should be understood that the correlations described in reference to FIG. 11 are merely exemplary and other mathematical relationships may be used or derived to associate exposure time 1102 to energy from a specific energy source to the amount or degree of change in a desired attribute. In some cases, the correlation 1100 may be generated by obtaining test data using a ball hitting machine to measure the relationship between duration of energy exposure and the effect on each of the attributes associated with the golf ball. In other cases, the effect of the duration of a particular energy on a particular attribute may be derived mathematically using algorithms or formulas or using software to model the relationships.

FIGS. 12 through 16 illustrate various systems for providing customized golf balls to consumers using the post production modification processes described herein. Generally, once stock golf balls containing configurable materials are initially produced, the stock golf balls may be later modified using the post production modification process to change the attributes associated with the stock golf balls to a desired set of attributes associated with the modified golf balls. The post production modification process may be configured to be performed by consumers directly, or through one or more intermediaries that produce the modified golf balls according to the desired attributes of a specific consumer or according to a range of potential desired attributes by consumers in general.

Figure 12:
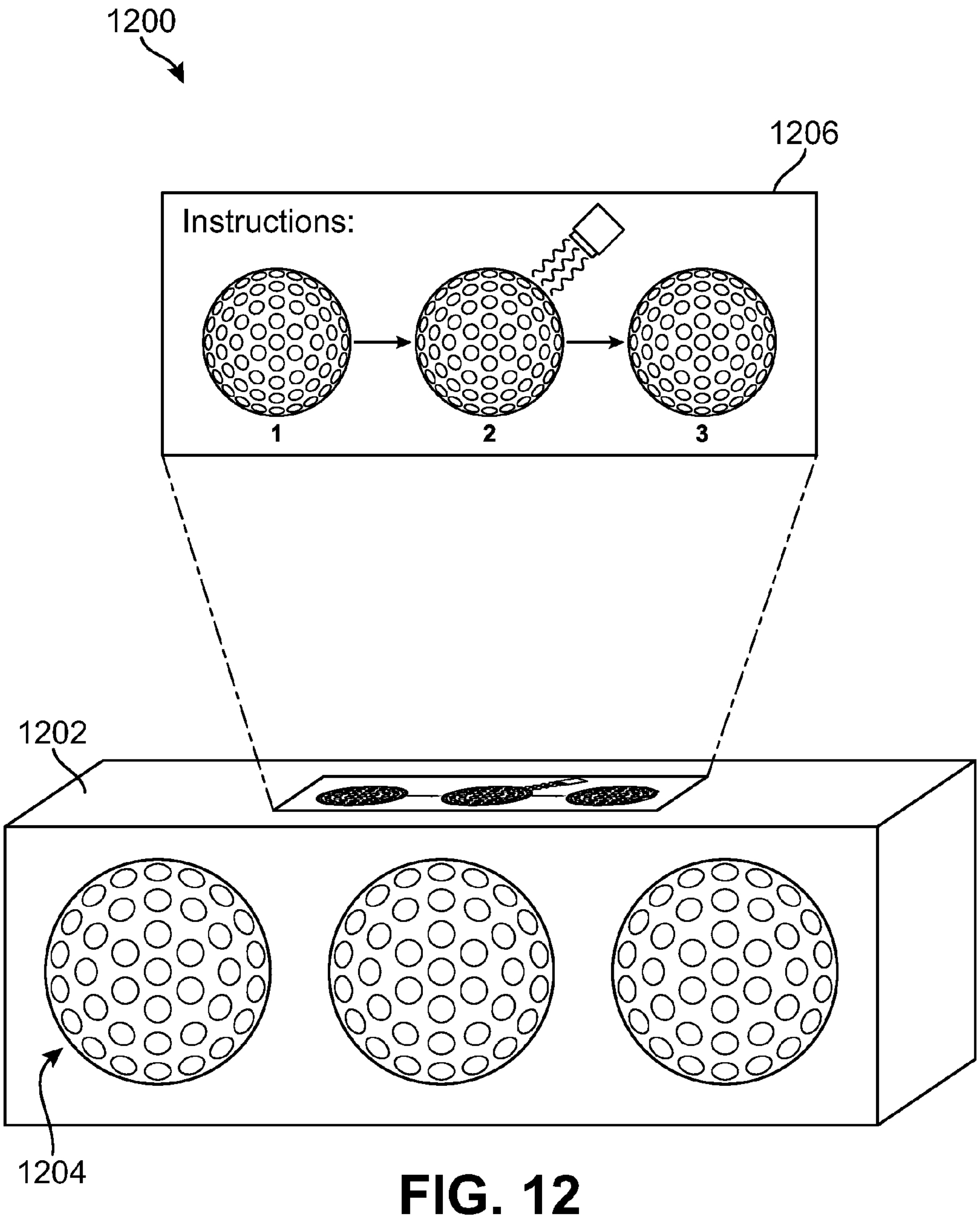
FIG. 12 is an isometric view of an exemplary embodiment of a kit of parts for post production modification of a golf ball containing configurable materials.

Referring now to FIG. 12, a kit of parts 1200 for a post production modification of a golf ball containing configurable materials is illustrated. In some embodiments, kit of parts 1200 may be configured to allow a consumer to modify a set of stock golf balls associated with a first set of attributes using one or more energy sources. With this arrangement, the consumer may modify the set of stock golf balls to exhibit a second set of attributes associated with desired physical properties and/or play characteristics. In an exemplary embodiment, kit of parts 1200 may include a container 1202. Container 1202 may be configured to hold one or more stock golf balls. In this embodiment, container 1202 is configured to hold a set of three stock golf balls 1204. In other embodiments, container 1202 may be configured to hold a larger or smaller number of stock golf balls 1204.

In one embodiment, kit of parts 1200 may be further configured to include instructions 1206. Instructions 1206 may be configured to provide information to the consumer to allow the consumer to perform the post production modification process to change the set of attributes associated with stock golf balls 1204 to have desired attributes. In this embodiment, instructions 1206 are associated with container 1202. In other embodiments, however, instructions 1206 may have different forms, including, but not limited to: written, software included on a physical medium of some type, or a link to a website or application.

Figure 13:
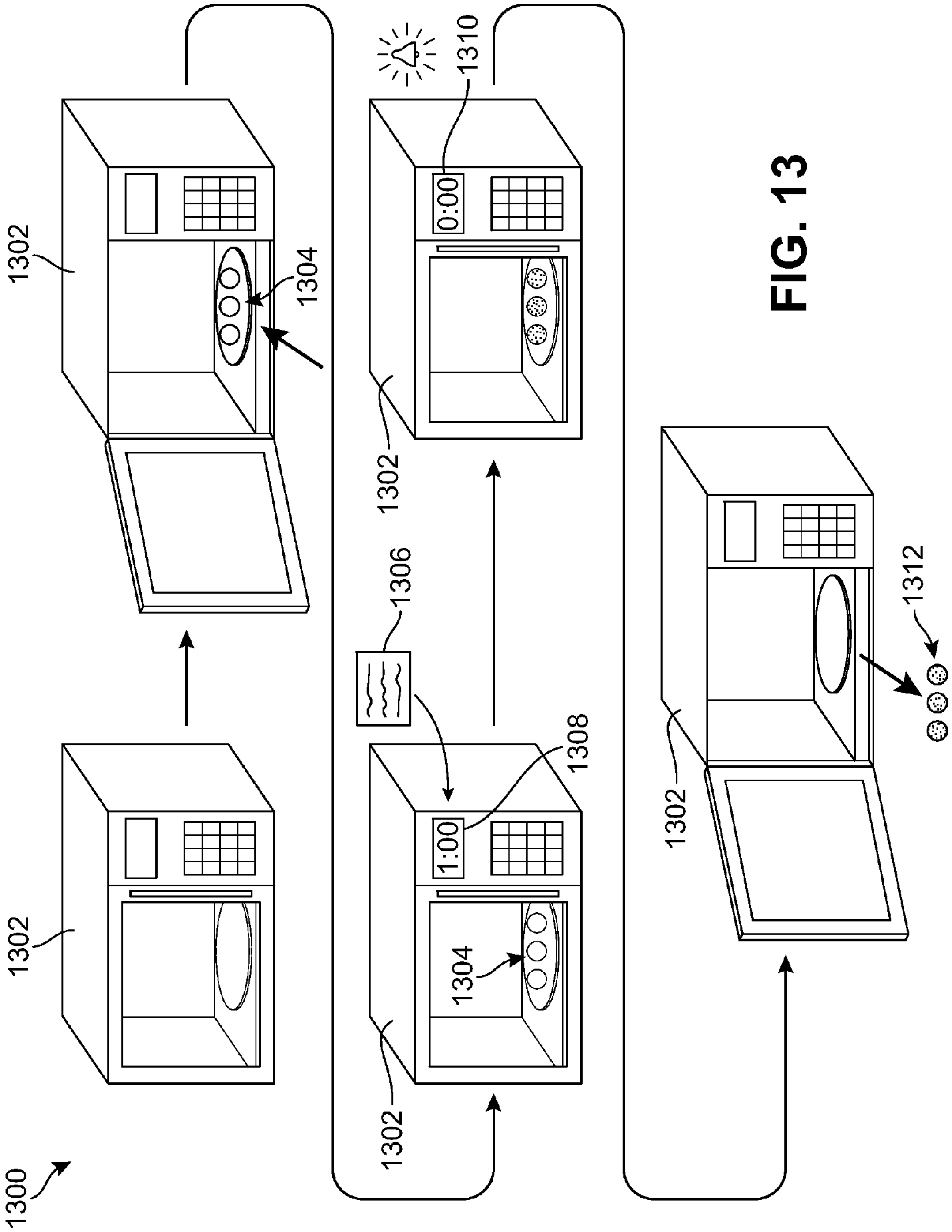
FIG. 13 is a schematic view of an exemplary embodiment of a process for using a kit of parts including a golf ball containing configurable materials.

Referring now to FIG. 13, a schematic view of an exemplary embodiment of a process 1300 for using a kit of parts including a set of stock golf balls containing configurable materials. In some embodiments, a consumer may use one or more energy sources that are typically available to a consumer. Such energy sources may include, but are not limited to: a conventional oven, a microwave oven, a IR heat lamp or hair dryer, and/or a UV light source. With this arrangement, a consumer may expose a set of stock golf balls to one or more types of energy from such energy sources.

In some embodiments, a set of stock golf balls may be manufactured, as described above, with one or more configurable materials that will interact with energy from an energy source typically available to a consumer. In an exemplary embodiment, a kit of parts may include instructions for a process 1300 of exposing a set of stock golf balls 1304 to microwave radiation from a microwave oven 1302. Set of stock golf balls 1304 may be manufactured with at least one configurable material that will interact with microwave radiation to affect a physical change in structure to stock golf balls 1304 such that a first set of attributes associated with stock golf balls 1304 may be modified.

As shown in FIG. 13, set of stock golf balls 1304 may be placed in microwave oven 1302 in an initial step. In some embodiments, process 1300 may include using instructions 1306 that have been provided with the kit of parts. In one embodiment, instructions 1306 may include information related to a time duration for exposing set of stock golf balls 1304 to microwave radiation to attain a desired set of attributes. In this embodiment, instructions 1306 inform a consumer that stock golf balls 1304 may be modified to attain the desired attributes by exposure to microwave radiation for a specific time duration at step 1308. In this embodiment, the time duration is 1 minute, however, it should be understood that the time duration may be any amount of time correlated to a specific change in the attributes associated with stock golf balls 1304.

At step 1310, stock golf balls 1304 have been exposed to microwave radiation for the specified time duration entered at step 1308. During the exposure time, the one or more configurable materials with set of stock golf balls 1304 that are configured to interact with microwave radiation have undergone a physical change in structure. This physical change in structure will correlate to a desired change in the attributes of set of stock golf balls 1304, as described in detail above. Accordingly, process 1300 may result in a set of modified golf balls 1312 that are associated with a second set of attributes. In this case, second set of attributes are different than first set of attributes associated with set of stock golf balls 1304 and may relate to one or more of a physical property or play characteristic. Using process 1300, a consumer may customize a set of stock golf balls 1304 included with a kit of parts to obtain a set of modified golf balls 1312 that exhibit the attributes that are selected by the consumer using the instructions 1306.

In another embodiment, set of stock golf balls 1304 may be manufactured with at least a second configurable material that will interact with a different type of radiation to affect a physical change in structure to stock golf balls 1304 such that a second set of attributes associated with stock golf balls 1304 may be modified. For example, the process described in FIG. 13 may be repeated with set of stock golf balls 1304 including at least a second configurable material that will interact with heat radiation, from an oven or other similar appliance, to affect a physical change in structure to stock golf balls 1304 such that the second set of attributes associated with stock golf balls 1304 may be modified.

In other embodiments, a consumer may use additional or different energy sources according to different sets of instructions included with the kit of parts to modify one or more stock golf balls to achieve modified golf balls that are customized according to the consumer's preferences.

In some embodiments, a customization system may be provided that includes multiple sets of stock golf balls containing configurable materials that are associated with various initial attributes. With this arrangement, multiple types of energy sources may be used in accordance with the post production modification process described herein to affect different modifications upon the multiple sets of stock golf balls to further customize a set of golf balls with a desired set of attributes.

Figure 14:
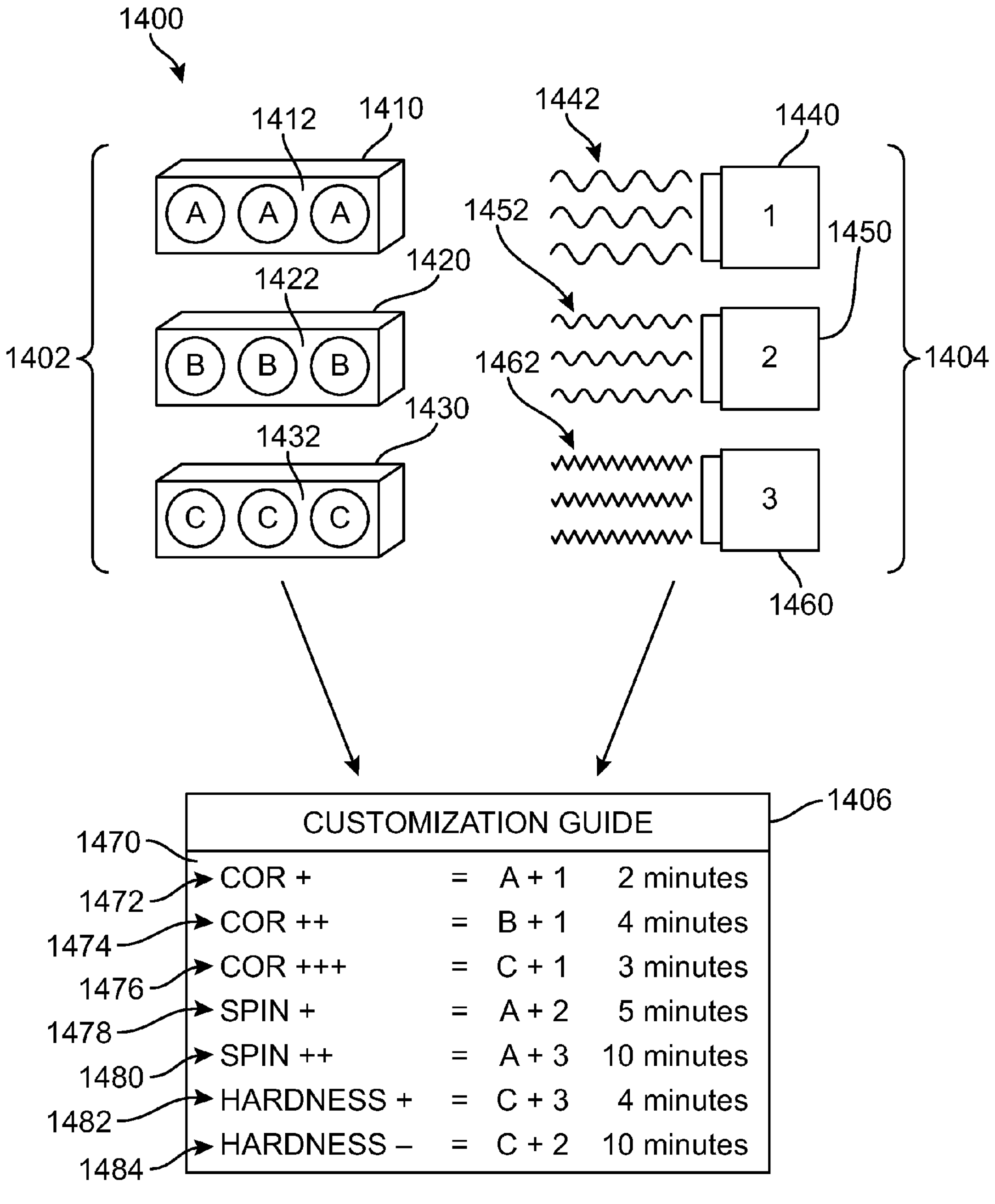
FIG. 14 is a schematic view of an exemplary embodiment of a post production modification system for golf balls.

Referring now to FIG. 14, a customization system 1400 for producing modified golf balls with desired attributes is illustrated. In this embodiment, customization system 1400 may include a group of multiple sets of stock golf balls 1402 containing configurable materials, each set of stock golf balls being associated with an initial set of attributes. In this embodiment, group of sets of stock golf balls 1402 includes a first set 1410 including stock golf balls 1412 associated with a first configuration and a second set 1420 including stock golf balls 1422 associated with a second configuration. Group of sets of stock golf balls 1402 may further include a third set 1430 including stock golf balls 1432 associated with a third configuration.

In some embodiments, the configuration of each set of stock golf balls in group 1402 may refer to a particular arrangement of configurable materials, as described in the embodiments above. For example, different arrangements may vary in type of configurable material used to manufacture each set of stock golf balls, susceptibility to energy from specific energy sources, the composition or placement of configurable material in one or more layers, and/or combination of any of these factors. In other embodiments, the configuration of each set of stock golf balls in group 1402 may refer to a particular set of attributes associated with the golf balls, including physical properties and/or play characteristics.

In this exemplary embodiment, first set 1410 including stock golf balls 1412 is associated with a first set of initial attributes and second set 1420 including stock golf balls 1422 is associated with a second set of initial attributes. Third set 1430 including stock golf balls 1432 may be associated with a third set of initial attributes.

In some embodiments, customization system 1400 may include a group of multiple types of energy sources 1404, each energy source may be associated with different energy types and/or wavelengths of energy. In this embodiment, group of multiple types of energy sources 1404 includes a first energy source 1440 associated with a first energy 1442, a second energy source 1450 associated with a second energy 1452, and/or a third energy source 1460 associated with a third energy 1462. In an exemplary embodiment, the various types of energy sources and/or energies associated with group 1404 may be configured to interact with one or more configurable materials disposed within a layer or multiple layers of the various stock golf balls associated with group 1402.

In one embodiment, customization system 1400 may further include a customization guide 1406. Customization guide 1406 may be configured to assist a user with determining which set of stock golf balls from group 1402 may be used with particular energy source or energy from group 1404 according to the post production modification process described herein to attain a set of modified golf balls that exhibit the attributes desired by the user. In some embodiments, customization guide 1406 may be a table or chart. In other embodiments, customization guide 1406 may be software included on a physical medium, an algorithm or program running on a computer, or a link to a website or application.

In an exemplary embodiment, customization guide 1406 may include instructions 1470 for combining a particular set of stock golf balls from group 1402 with a specific energy source from group 1404 to affect a desired attribute, including a physical property and/or play characteristic. In addition, in some embodiments, instructions 1470 may further include a time duration for exposure to the respective energy from the particular energy source.

In this embodiment, instructions 1470 associated with customization guide 1406 list several exemplary attributes associated with the physical properties and/or play characteristics of a golf ball that may be attained using customization system 1400. In one embodiment, attributes may be varied in amount or degree by using a different set of stock golf balls containing different arrangements of configurable materials. For example, in this embodiment, a user may obtain modified golf balls that exhibit a small increase in coefficient of restitution (COR) 1470 over stock golf balls by exposing first set 1410 of stock golf balls 1412 to first energy 1442 from first energy source 1440 for a time duration of 2 minutes. Similarly, a user may obtain modified golf balls that exhibit a medium increase in COR 1472 over stock golf balls by exposing second set 1420 of stock golf balls 1422 to first energy 1442 from first energy source 1440 for a time duration of 4 minutes. Additionally, a user may further obtain modified golf balls that exhibit a large increase in COR 1476 over stock golf balls by exposing third set 1430 of stock golf balls 1432 to first energy 1442 from first energy source 1440 for a time duration of 3 minutes.

In other embodiments, attributes may be varied in amount or degree by using a different type of energy and/or energy source. For example, in this embodiment, a user may obtain modified golf balls that exhibit a small increase in spin 1478 over stock golf balls by exposing first set 1410 of stock golf balls 1412 to second energy 1452 from second energy source 1450 for a time duration of 5 minutes. Similarly, a user may obtain modified golf balls that exhibit a large increase in spin 1480 over stock golf balls by exposing first set 1410 of stock golf balls 1412 to third energy 1462 from third energy source 1460 for a time duration of 10 minutes.

In still other embodiments, attributes may be varied by changing the time duration of exposure. In addition, in various embodiments attributes may be varied by using a combination of different sets of stock golf balls, energy sources, energy, and/or time duration. For example, in this embodiment, a user may obtain modified golf balls that exhibit an increase in hardness 1482 over stock golf balls by exposing third set 1430 of stock golf balls 1432 to third energy 1462 from third energy source 1460 for a time duration of 4 minutes. In addition, a user may obtain modified golf balls that exhibit a decrease in hardness 1484 over stock golf balls by exposing third set 1430 of stock golf balls 1432 to second energy 1452 from second energy source 1450 for a time duration of 10 minutes.

Figure 15:
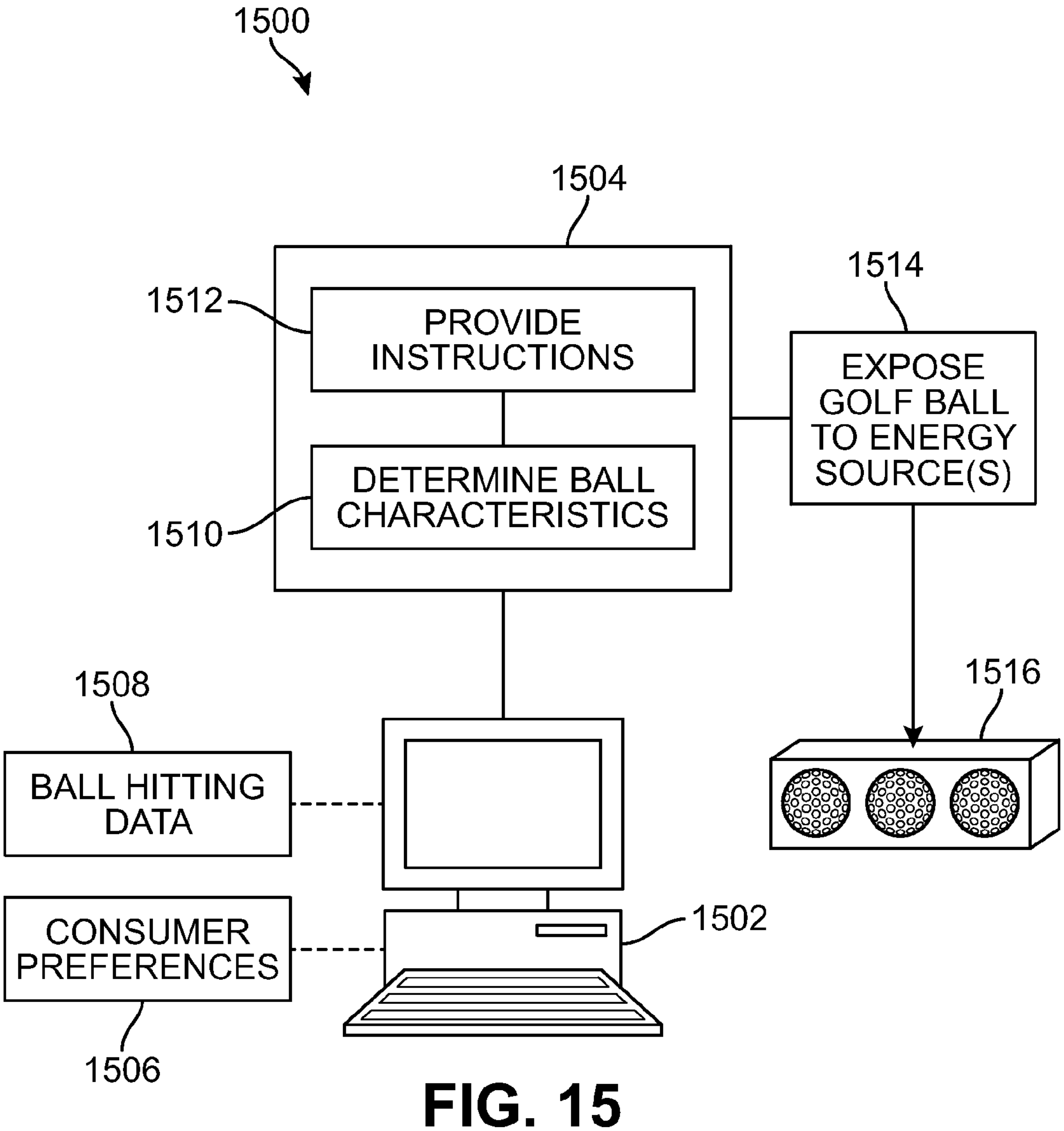
FIG. 15 is a representational view of an exemplary embodiment of a system for obtaining modified golf balls using a post production modification system.

In some embodiments, customized instructions for modifying a stock golf ball to exhibit a desired set of attributes may be obtained using information from a consumer concerning the desired physical properties and/or play characteristics. Referring now to FIG. 15, a customized instruction system 1500 is illustrated to allow a consumer to provide information regarding specific desired physical properties and/or play characteristics for a modified golf ball.

In an exemplary embodiment, customized instruction system 1500 may include an input mechanism 1502 for receiving information from a consumer regarding the desired attributes of a modified golf ball. In this embodiment, input mechanism 1502 is a computer. In other embodiments, input mechanism 1502 may be any mechanism that is configured to gather information associated with a consumer's desired attributes for a modified golf ball. In one embodiment, information about a consumer's desired attributes may be gathered by input mechanism 1502 based on consumer preferences 1506. In another embodiment, information about a consumer's desired attributes may be gathered by input mechanism 1502 based on information obtained from ball hitting data 1508.

In some embodiments, ball hitting data 1508 may be obtained from measuring parameters associated with hitting a golf ball using a golf ball fitting system, including the golf ball fitting system disclosed in copending and commonly owned U.S. Pat. No. 8,758,169, currently U.S. patent application Ser. No. 12/498,364, entitled "Method and System for Golf Ball Fitting Analysis,", and filed on Jul. 7, 2009, which is incorporated herein by reference.

Once information related to the consumer's desired attributes is gathered by input mechanism 1502, a customized instruction application or program 1504 may be used to determine the instructions for modifying a stock golf ball containing configurable material using the post production modification process described here. In an exemplary embodiment, customized instruction application 1504 may be associated with one or more computers or processors, including input mechanism 1502, located at a consumer's home, at a retail location, a factory, or a remote location. Once customized instruction application 1504 receives the information related to the consumer's desired attributes, application 1504 determines the corresponding ball characteristics 1510 that relate to the desired attributes and provides instructions 1512. Instructions 1512 may include one or more instructions that are substantially similar to customization guide 1406, described above.

In an exemplary embodiment, after customized instruction application 1504 has provided instructions 1512, stock golf balls may be exposed to one or more energy sources 1514 as indicated in instructions 1512. In various embodiments, exposure to one or more energy sources 1514 may be performed at different locations. In some cases, exposure 1514 may be performed by a consumer in his or her home using a consumer's energy source. In other cases, exposure 1514 may be performed at a factory or a retail location using an industrial or professional energy source.

After exposure 1514 of stock golf balls containing configurable materials according to instructions 1512, modified golf balls 1516 associated with the consumer's desired attributes may be provided to the consumer. In this embodiment, modified golf balls 1516 have been changed so as to exhibit the consumer's desired attributes gathered by input mechanism 1502.

In some embodiments, the principles described herein for post production modification of golf balls with configurable materials may be used for a post production modification distribution system. By using a post production modification process, stock golf balls may be changed to exhibit a wide range of attributes when modified using different post production modification techniques. With this arrangement, a large number of different modified golf balls associated with different physical properties and/or play characteristics may be provided to consumers using a small number of distinct stock keeping units (SKUs).

Figure 16:
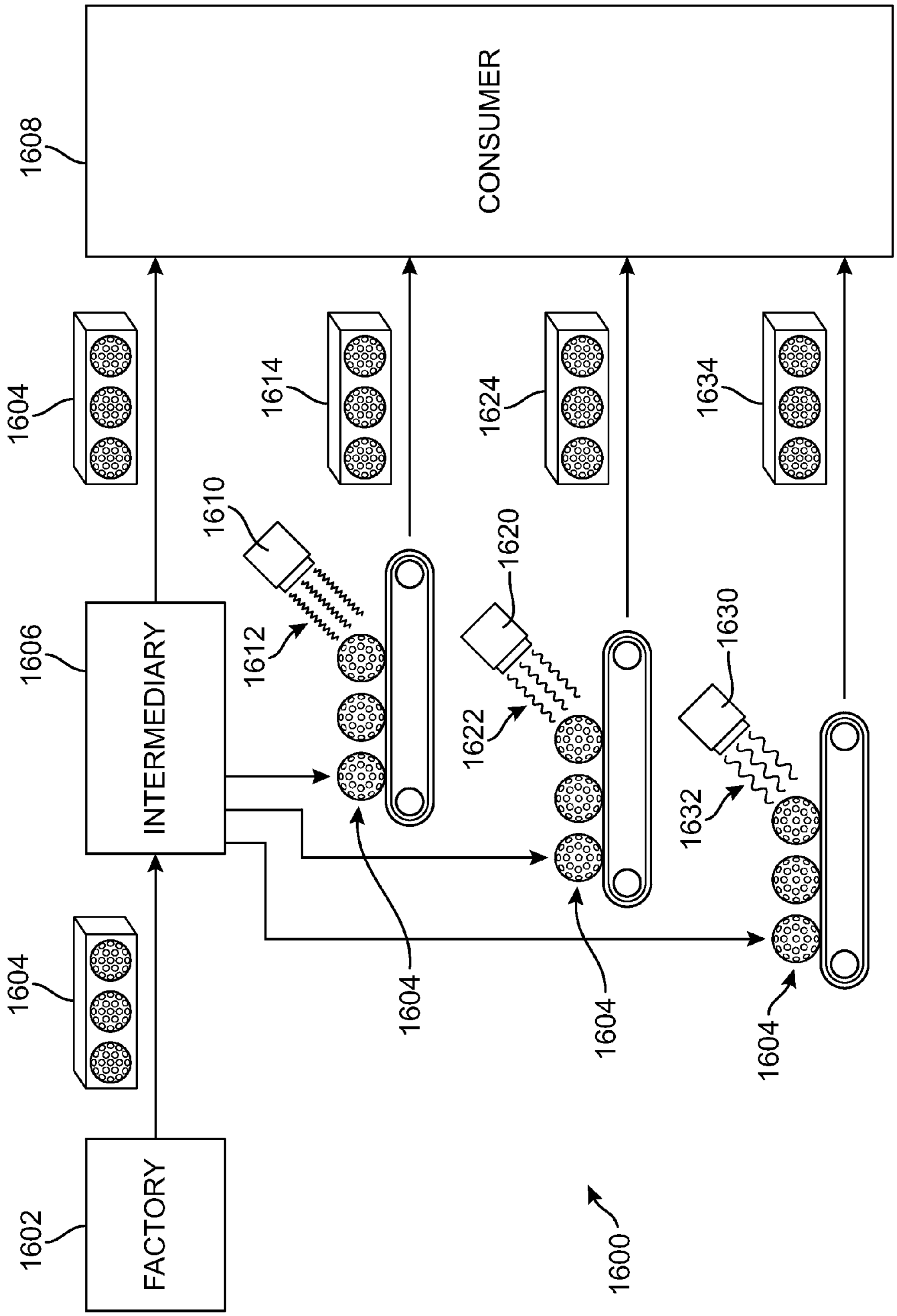
FIG. 16 is a representational view of an exemplary embodiment of a system for distributing various types of golf balls using a post production modification system.

Referring now to FIG. 16, a distribution system 1600 for producing multiple modified golf ball sets having different sets of attributes from a common stock golf ball set is illustrated. In this embodiment, a factory 1602 may be configured to manufacture multiple units of a stock golf ball set 1604 including configurable materials. In this embodiment, stock golf ball set 1604 is associated with an initial set of attributes, including physical properties and play characteristics. Stock golf ball set 1604 is configured to be in a finished state and capable of being used by a consumer to play golf, if desired. In some cases, stock golf ball set 1604 may undergo some amount of minimal finishing related to appearance, rather than physical structure, at an intermediary facility 1606 prior to being provided to a consumer 1608. In other cases, stock golf ball set 1604 may be provided directly to consumer 1608 as manufactured at factory 1602.

In some embodiments, intermediary 1606 may receive multiple units of stock golf ball set 1604 for post production modification. In an exemplary embodiment, intermediary 1606 may use a post production modification process on one or more groups of units of stock golf ball set 1604 to produce different groups of units of modified golf ball sets having various attributes that are different from the initial set of attributes associated with stock golf ball set 1604. In one embodiment, units of stock golf ball set 1604 may be modified using one or more post production modification processes described herein. In this embodiment, intermediary 1606 may modify units of stock golf ball set 1604 using different types of energy sources to impart different attributes to the units of modified golf ball sets.

Referring again to FIG. 16, in this embodiment, intermediary 1606 processes units of stock golf ball set 1604 using a first energy source 1610 associated with a first energy 1612, a second energy source 1620 associated with a second energy 1622, and/or a third energy source 1630 associated with a third energy 1632. As described above, stock golf balls containing configurable materials undergo various physical changes in structure when exposed to the respective energy from each of first energy source 1610, second energy source 1620, and/or third energy source 1630. The physical changes in structure affect a change in the associated attributes of the modified golf ball.

In an exemplary embodiment, stock golf ball set 1604 may be exposed with first energy 1612 from first energy source 1610 by intermediary 1606 to produce a first modified golf ball set 1614. In this embodiment, first modified golf ball set 1614 is associated with a first set of modified attributes that are different than the initial set of attributes associated with stock golf ball set 1604. First modified golf ball set 1614 may be made available to consumer 1608, directly or through a retailer.

Similarly, stock golf ball set 1604 may be exposed with second energy 1622 from second energy source 1620 by intermediary 1606 to produce a second modified golf ball set 1624. In this embodiment, second modified golf ball set 1624 is associated with a second set of modified attributes that are different than the initial set of attributes associated with stock golf ball set 1604. Second modified golf ball set 1624 may be made available to consumer 1608, directly or through a retailer. In addition, stock golf ball set 1604 also may be exposed with third energy 1632 from third energy source 1630 by intermediary 1606 to produce a third modified golf ball set 1634. In this embodiment, third modified golf ball set 1634 is associated with a third set of modified attributes that are different than the initial set of attributes associated with stock golf ball set 1604. Third modified golf ball set 1634 may be made available to consumer 1608, directly or through a retailer.

In some embodiments, each of first modified attributes associated with first modified golf ball set 1614, second set of modified attributes associated with second modified golf ball set 1624, and/or third set of modified attributes associated with third modified golf ball set 1634 may be different from both initial set of attributes associated with stock golf ball set 1604 and each other. In other embodiments, some of the attributes may be similar, while other attributes may be different. In an exemplary embodiment, each of stock golf ball set 1604, first modified golf ball set 1614, second modified golf ball set 1624, and/or third modified golf ball set 1634 may be associated with differences related to physical properties and/or play characteristics to some degree. In addition, each golf ball set may be assigned a separate, distinct stock keeping unit (SKU) for distribution to retailers and/or consumers.

In additional embodiments, intermediary 1606 may perform any of the post production modification process to modify golf balls containing configurable materials as described in any of the embodiments herein, including using different types, wavelengths, intensities, or duration of energy from one or more energy sources, and using multiple stock sets of golf balls with different configurations, as described above. In addition, one or more coatings may be applied and/or exposed to energy sources as described above, by intermediary 1606 as part of the process of finishing the golf ball sets for distribution to retailers and/or consumers.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A golf ball comprising:

a core, a mantle layer surrounding the core;

a cover layer surrounding the mantle layer;

wherein at least one of the core and the mantle layer comprises a member selected from the group consisting of nitrogen blowing agents subject to activation with heat; magnetic materials entrained within heat labile materials that undergo polymerization upon heating; and combinations thereof, wherein each of the core and the mantle layer independently comprises a member selected from the group consisting of agents subject to activation with heat; magnetic materials entrained within heat labile materials that undergo polymerization upon heating; and combinations thereof.

2. A golf ball comprising:

a core, a mantle layer surrounding the core;

a cover layer surrounding the mantle layer;

wherein at least one of the core and the mantle layer comprises a member selected from the group consisting of nitrogen blowing agents subject to activation with heat; magnetic materials entrained within heat labile materials that undergo polymerization upon heating; and combinations thereof, wherein the member comprises a magnetic material entrained within a heat labile material that undergoes polymerization upon heating.

3. A golf ball comprising:

a core, a mantle layer surrounding the core;

a cover layer surrounding the mantle layer;

wherein at least one of the core and the mantle layer comprises a member selected from the group consisting of nitrogen blowing agents subject to activation with heat; magnetic materials entrained within heat labile materials that undergo polymerization upon heating; and combinations thereof, wherein the member is a first member and at least one of the core and the mantle layer includes a second member selected from the group consisting of nitrogen blowing agents subject to activation with heat; magnetic materials entrained within heat labile materials that undergo polymerization upon heating; and combinations thereof, and further wherein either:

(a) the second member is different than the first member or (b) the second member is disposed within a different one of the core and the mantle layer than the first member.

4. The golf ball of claim 3, wherein the second member is different than the first member.

5. The golf ball of claim 3, wherein the second member is disposed within a different one of the core and the mantle layer than the first member.

* * * * *